United States Patent
St-Pierre

(10) Patent No.: US 12,042,961 B2
(45) Date of Patent: Jul. 23, 2024

(54) DISPENSING DEVICE FOR DOSING POWDERED MATERIAL

(71) Applicant: OPTIMAX PLASTIC LLC, Kent, OH (US)

(72) Inventor: Alain St-Pierre, Kent, OH (US)

(73) Assignee: OPTIMAX PLASTIC LLC, Kent, OH (US)

( * ) Notice: Subject to any disclaimer, the term of this patent is extended or adjusted under 35 U.S.C. 154(b) by 314 days.

(21) Appl. No.: 17/497,162

(22) Filed: Oct. 8, 2021

(65) Prior Publication Data

US 2022/0143878 A1    May 12, 2022

Related U.S. Application Data

(60) Provisional application No. 63/110,435, filed on Nov. 6, 2020.

(51) Int. Cl.
*B29C 41/36* (2006.01)
*B29C 41/52* (2006.01)
*G01G 15/00* (2006.01)

(52) U.S. Cl.
CPC .............. *B29C 41/36* (2013.01); *B29C 41/52* (2013.01); *G01G 15/006* (2013.01)

(58) Field of Classification Search
CPC ....... G01G 2015/002; G01G 2015/003; G01G 2015/005; G01G 15/00; G01G 15/006; B65B 1/30; B65B 1/32; B65B 1/34

USPC .................................................. 141/83, 275
See application file for complete search history.

(56) References Cited

U.S. PATENT DOCUMENTS

| | | | | |
|---|---|---|---|---|
| 5,038,839 A * | 8/1991 | Morimoto | ........... | G01G 15/006 141/83 |
| 5,566,732 A * | 10/1996 | Nelson | ................. | B67D 1/1236 141/351 |
| 5,853,244 A * | 12/1998 | Hoff | .................... | B01F 35/2209 700/285 |
| 5,947,169 A * | 9/1999 | Wegman | ............... | B65B 39/003 141/2 |
| 6,188,936 B1 * | 2/2001 | Maguire | ............. | B01F 35/2207 366/18 |
| 8,567,455 B2 * | 10/2013 | Saranow | ............ | B01F 33/8442 141/83 |
| 8,584,714 B2 * | 11/2013 | Gaultney | ............... | G01G 19/38 222/77 |
| 9,052,228 B2 * | 6/2015 | Sollazzo Lee | ....... | G01G 13/026 |
| 9,334,150 B1 * | 5/2016 | Ost | ...................... | B67D 1/1236 |
| 2001/0027823 A1 * | 10/2001 | Luchinger | ............ | G01G 13/024 222/408 |

* cited by examiner

*Primary Examiner* — Timothy L Maust
(74) *Attorney, Agent, or Firm* — Hudak, Shunk & Farine Co. LPA

(57) ABSTRACT

A dispensing device for dosing material, preferably powdered molding compound suitable for use with rotational molding machines. The device includes a hopper for receiving and storing the material to be dispensed and a dispensing system that transfers an exact amount of material to a container based upon information contained on an identifying tag of the container that is read by a scanner of the device.

20 Claims, 3 Drawing Sheets

DISPENSING DEVICE FOR DOSING POWDERED MATERIAL

FIELD OF THE INVENTION

The present invention relates to a dispensing device for dosing material, preferably powdered molding compound suitable for use with rotational molding machines. The device includes a hopper for receiving and storing the material to be dispensed and a dispensing system that transfers an exact amount of material to a container based upon information contained on an identifying tag of the container that is read by a scanner of the device.

BACKGROUND OF THE INVENTION

Rotational molding or roto-molding is commonly used to mold polymers into hollow objects and parts. To create the object, a charge or shot weight of material is introduced into the mold, which is heated and rotated around a plurality of axes. During rotation, the material softens and sticks to the walls of the mold. The mold continues to rotate during a cooling phase to maintain the desired shape of the object.

Powdered materials are often utilized for rotational molding for reasons including ease of melting small particle size materials and faster production times.

Dispensing an accurate charge weight to the mold is critical to produce a part having proper thickness. Using too much material is not cost effective for the manufacturer. Using too little material may lead to defective and/or rejected parts.

It is also critical to utilize the correct color material for molding. Producing parts of incorrect color is wasteful and costs the molder time and money.

In view of the above, it is a problem of the prior art to accurately and consistently measure any appropriate charge or shot weight and color for a particular mold.

SUMMARY OF THE INVENTION

The problems of the prior art and others are solved by the dispensing device of the present invention which accurately measures a weight of molding material, preferably powder, and dispenses the material to a container that is used to fill a mold. The dispensing device also ensures the proper color of material is utilized.

Still another object and embodiment of the invention is to provide a dispensing device that recognizes identifying tags from a plethora of different containers and is able to dispense a precise amount of material into each container as called for by the identifying tag.

Yet another object and embodiment of the invention is to provide a device having a shielded dispensing area, such as in a housing which minimizes contamination and also reduces airborne powder.

In one aspect of the invention, a dispensing device for dosing material is disclosed, including a housing including a hopper having a fill port adapted to receive and hold material to be dispensed from the device, the hopper having an outlet; a feeder positioned to receive the material from the hopper outlet; a scale located in a lower portion of the housing below a level of the feeder and capable of measuring a weight of the material dispensed from the feeder; at least one container that can be situated on the scale and have the material added thereto from the feeder, wherein each container includes a unique identifying tag readable by a scanner of the device when the container is located on the scale, the identifying tag comprising information relating to the amount of material to be dispensed into the container; and wherein a controller dispenses a set amount of material from the feeder into the container based upon the information from the identifying tag read by the scanner and sent to the controller.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
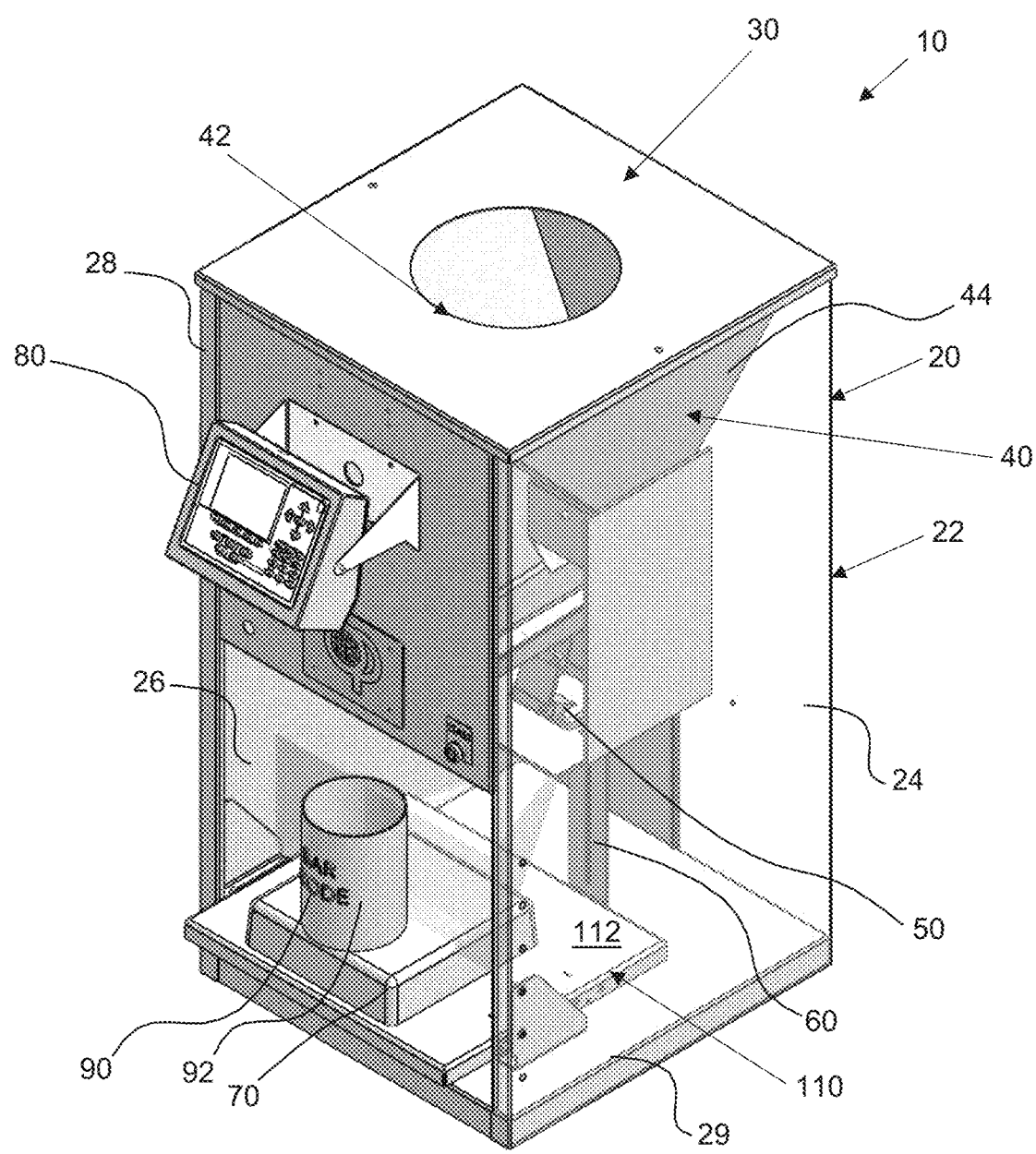
FIG. 1 is a slightly downward looking perspective view of one embodiment of a dispensing device of the present invention.
Figure 2:
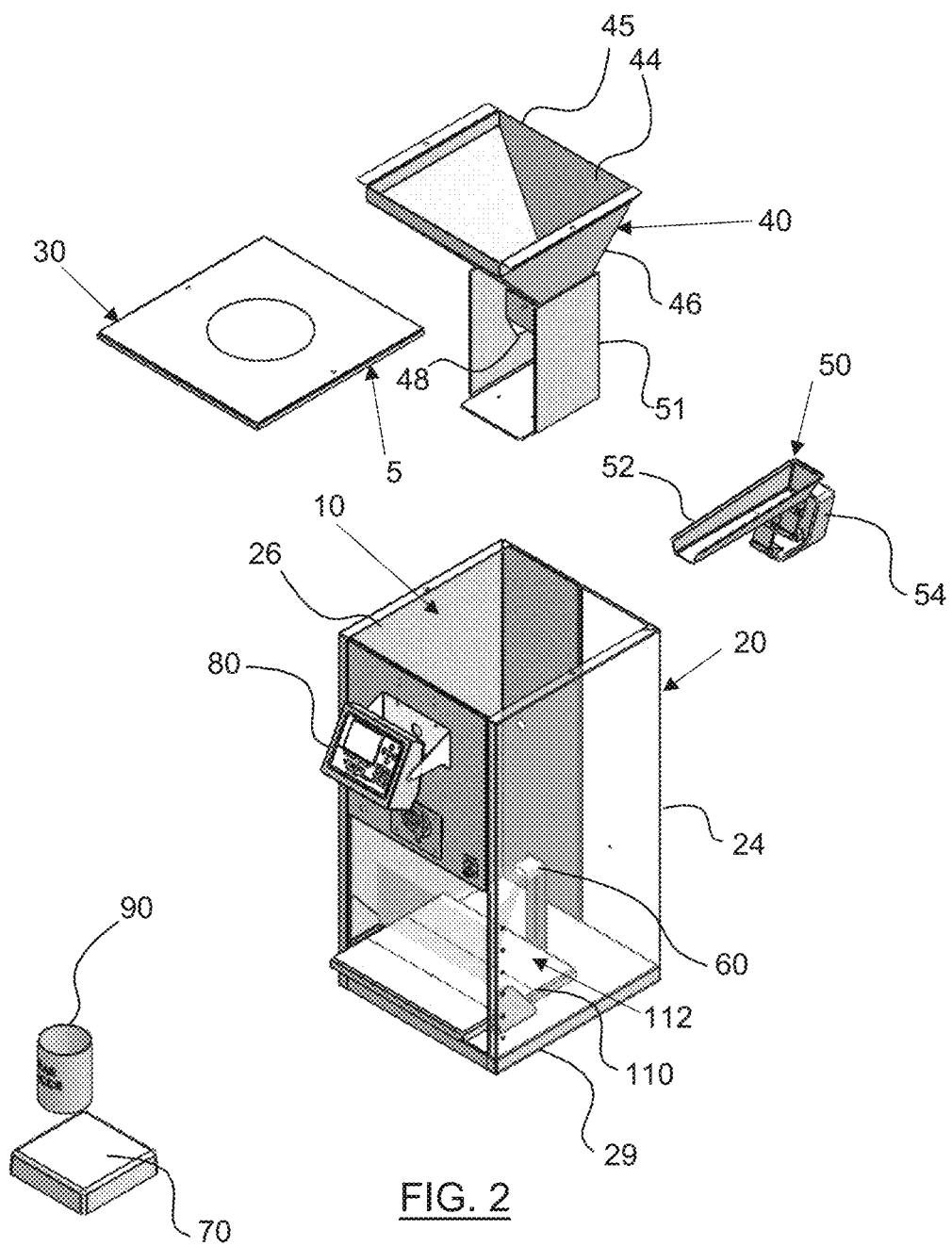
FIG. 2 is an exploded view of FIG. 1, showing various features of the device.
Figure 3:
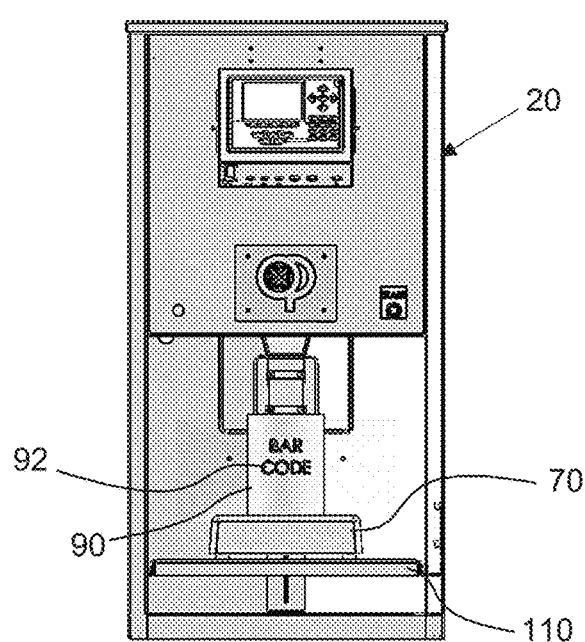
FIG. 3 is a front view of the device particularly illustrating the Tillable container including an identifying tag situated on a scale and able to receive material from the feeder.
Figure 4:
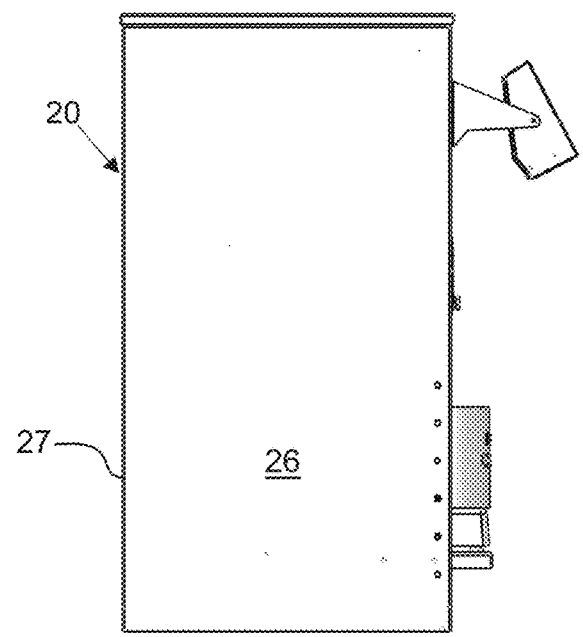
FIG. 4 is a left side view of the device.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

FIG. 1 illustrates a dispensing device 10 of the present invention, wherein a right-side panel 22 of housing 20 is shown transparently in order to reveal interior components.

In a preferred embodiment, housing 20 is enclosed on three sides, preferably right side 22, rear 24 and left side 26. Front 28 is partially enclosed at the upper end.

Housing upper end 30 provides access to hopper 40 through hopper fill port 42 which is an aperture of a suitable size to allow molding material such as powder to be placed within the device. The hopper fill port 42 is shown round in shape, but is not limited thereto and can have any desired configuration.

Hopper 40 is a material storage compartment that holds the material until it is transferred to the feeder 50. Hopper 40 includes a funnel 44 having an upper end 45 that is wider than a lower end 46. The shape of funnel 44 encourages gravimetric material flow to the feeder. The capacity of the hopper 40 generally depends on the average amount of material that will be dispensed. For example, in one embodiment, the hopper has a 125 pound capacity. In one embodiment the hopper has a flat back or vertical wall which provides faster material drop rate.

Feeder 50 is situated below an outlet 48 of hopper 40 and receives material therefrom and dispenses a set amount to container 90 upon activation by controller 80. Feeder 50 is operatively connected to feeder shelf 51 which in turn is connected to hopper 40. Feeder shelf 50 has a base on which feeder 50 rests and is connected. Two upwardly extending arms connect the feeder shelf 50 to hopper 40.

Feeder 50 includes a feed chute 52 and mechanism 54 for manipulating movement of the feed chute 52. Upon activation by controller 80, feed chute 52 discharges material therefrom at a desired rate into container 90.

In one preferred embodiment, feeder 50 is a vibratory feeder and will move the material to the drop point starting from the hopper outlet. The feeder is controlled by the controller 80.

When the desired, precise amount of material has been dispensed, feeder 50 is deactivated and material flow ceases from feed chute 52. Feed chute 52 is formed as a trough in one embodiment, having three sides and an open end. The depths of the trough can vary, preferably wherein the trough has an upper end situated under the hopper outlet 48. The hopper outlet is situated in the feeder chute and if the feeder is not activated the material will not flow out of the hopper.

The dispensing device 10 also includes a scanner 60 situated in the housing such that it is able to scan a container 90, in particular the identifying tag 92, placed in the housing 20. The type of scanner can vary so long as it performs its intended function of identifying the container 90 and relaying information from an identifying tag 92 of the container 90 to the controller 80.

Scanner 60 is a code reader that is suitable for reading any identifying tag 92 used on a container such as, but not limited to, a bar code such as a one-dimensional barcode, such as a UPC code, EAN code, Code 39, Code 128, ITF, Code 93, Codaban, GS1 Databar or MSI Plessey, or a two-dimensional barcode such as a OR code, datamatrix code, PDF417 or Aztec, or an RFID tag, or equivalent.

The housing 20 includes a base 29 that interconnects sides 24, 26 and rear 27. The base 29 forms a surface for mounting a scale 70, directly or indirectly. In a preferred embodiment base 29 includes a height adjustable shelf 110 having a platform 112 that can be situated at a plurality of different heights within the housing. This allows for accommodation of different sized containers and can serve to ensure the mouth of the container is sufficiently close to the feeder for filling.

Scale 70 is operatively connected to the platform 110 as well as the controller 80 and transmits the weight of any object on the scale to the controller 80. The scale can send feedback to the controller 80, preferably in real time.

Controller 80 is programmed to identify each container 90 placed on scale 70. Depending on controller data and parameters set in the device, the container may be found acceptable, in which case the identifying tag 90 read by the scanner 60 provides information to the controller about one or more of the amount of material that is to be added to the container, container weight. The controller 80 can be adjusted and programmed for precision adjustment from 1.0 lbs. to 0.001 lbs. as desired.

If the container is not suitable or not to be used within the device, the controller will reject the container and not instruct the feeder to fill it.

In accordance with the patent statutes, the best mode and preferred embodiment have been set forth; the scope of the invention is not limited thereto, but rather by the scope of the attached claims.

What is claimed is:

1. A dispensing device for dosing material, comprising:
   a housing including a hopper having a fill port adapted to receive material able to be molded, wherein the hopper holds material to be dispensed from the device, the hopper having an outlet;
   a feeder positioned to receive the material from the hopper outlet;
   a scale located in a lower portion of the housing below a vertical height level of the feeder and capable of measuring a weight of the material dispensed from the feeder;
   at least one container that can be situated on the scale and have the material added thereto from the feeder, wherein each container includes a unique identifying tag readable by a scanner of the device when the container is located on the scale, wherein the identifying tag comprises information relating to the amount of material by weight to be dispensed into the container; and
   a controller, wherein the controller is able to dispense a set amount of material by weight from the feeder into the container based upon the information from the identifying tag read by the scanner and sent to the controller.

2. The dispensing device according to claim 1, wherein the housing is enclosed on at least three sides to minimize contamination of the container when located on the scale.

3. The dispensing device according to claim 1, wherein the hopper fill port is an orifice in a top surface of the housing, wherein a hopper funnel is connected to the hopper fill port and includes the hopper outlet at a lower end.

4. The dispensing device according to claim 3, wherein a feeder shelf is connected to the hopper at a location below the outlet, the feeder being operatively connected to the feeder shelf.

5. The dispensing device according to claim 1, wherein the feeder has a base and a feeder chute connected to the base, wherein the feeder is a vibrating feeder, wherein in a dispensing mode the material is transferred from the feeder chute to the container.

6. The dispensing device according to claim 1, wherein the scanner is located within the housing and is a bar code reader.

7. The dispensing device according to claim 1, wherein the scale is operatively connected to an adjustable-height shelf connected to a base of the housing.

8. The dispensing device according to claim 1, wherein two or more containers are present, with each having a unique identifying tag.

9. The dispensing device according to claim 1, wherein the controller is connected to a front panel of the housing, wherein the controller is operatively connected to the scale, scanner and feeder.

10. The dispensing device according to claim 9, wherein the identifying tag further comprises information relating to the color of material to be utilized.

11. A dispensing device for dosing material, comprising:
    a housing including a hopper at an upper end of the device having a fill port adapted to receive material able to be molded, wherein the hopper includes a funnel located below the fill port adapted to hold material to be dispensed from the device, wherein the hopper has an outlet at a lower end of the funnel;

a vibratory feeder positioned below the hopper to receive the material from the hopper outlet;

a scale located in a lower portion of the housing below a vertical height level of the feeder and capable of measuring a weight of the material dispensed from the feeder;

at least one container that can be situated on the scale and have the material added thereto from the feeder, wherein each container includes a unique identifying tag readable by a scanner of the device when the container is located on the scale, wherein the identifying tag comprises information relating to the amount of material by weight to be dispensed into the container; and a controller, wherein the controller is able to dispense a set amount of material by weight from the feeder into the container based upon the information from the identifying tag read by the scanner and sent to the controller.

12. The dispensing claim according to claim 11, wherein the hopper includes at least one vertical wall.

13. The dispensing claim according to claim 11, wherein the housing is enclosed on at least three sides to minimize contamination and reduce airborne powders.

14. The dispensing claim according to claim 11, wherein the vibratory feeder includes a feed chute and a mechanism for manipulating movement of the feed chute, wherein upon activation by the controller, the feed chute discharges material therefrom at a desired rate into the container.

15. The dispensing claim according to claim 14, wherein the feed chute comprises a trough having three sides and an open end, and wherein the trough has an upper end situated under the hopper outlet.

16. The dispensing device according to claim 15, wherein a feeder shelf is connected to the hopper at a location below the outlet, the feeder being operatively connected to the feeder shelf.

17. The dispensing device according to claim 11, wherein the container identifying tag is a bar code, and wherein the scanner is a code reader able to read the bar code, wherein the scanner is in the housing and can scan the identifying tag on the container and transmit that information to the controller in order to dispense the proper amount of material to the container.

18. The dispensing device according to claim 17, wherein the scale is positioned on a platform on a base of the housing and accurately measures the weight of material dispensed and transmits real time feedback to the controller.

19. The dispensing device according to claim 18, wherein the base of the housing includes a height adjustable shelf that allows for the accommodation of different sized containers.

20. The dispensing device according to claim 19, wherein the controller is programmed to identify each container placed on the scale and receives information from the scanner about the amount of material to be dispensed, and the controller is programed for precision adjustments from 0.001 lbs. to 1.0 lbs.

* * * * *